(12) United States Patent
Obara et al.

(10) Patent No.: US 12,454,269 B2
(45) Date of Patent: Oct. 28, 2025

(54) CONTROL DEVICE OF HYBRID ELECTRIC VEHICLE FOR IMPLEMENTING VIBRATION DAMPING FOR THE VEHICLE BODY USING ELECTRIC MOTORS

(71) Applicant: TOYOTA JIDOSHA KABUSHIKI KAISHA, Toyota (JP)

(72) Inventors: Keita Obara, Nisshin (JP); Yoshihiro Furuya, Toyota (JP); Hideyuki Handa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 18/136,555

(22) Filed: Apr. 19, 2023

(65) Prior Publication Data
US 2024/0001929 A1 Jan. 4, 2024

(30) Foreign Application Priority Data
Jun. 30, 2022 (JP) ................................. 2022-105891

(51) Int. Cl.
| | | |
|---|---|---|
| B60L 9/00 | (2019.01) | |
| B60W 10/06 | (2006.01) | |
| B60W 10/08 | (2006.01) | |
| B60W 20/00 | (2016.01) | |

(Continued)

(52) U.S. Cl.
CPC ............ *B60W 30/20* (2013.01); *B60W 10/06* (2013.01); *B60W 10/08* (2013.01); *B60W 20/00* (2013.01); *B60W 30/192* (2013.01); *B60W 2510/0638* (2013.01); *B60W 2510/0657* (2013.01); *B60W 2510/0685* (2013.01); *B60W 2510/244* (2013.01); *B60W 2510/246* (2013.01); *B60W 2540/10* (2013.01); *B60W 2710/083* (2013.01)

(58) Field of Classification Search
CPC ...... B60W 30/20; B60W 10/06; B60W 10/08; B60W 20/00; B60W 30/192; B60W 2510/0638; B60W 2510/0657; B60W 2510/0685; B60W 2510/244; B60W 2510/246; B60W 2540/10; B60W 2710/083
See application file for complete search history.

(56) References Cited

U.S. PATENT DOCUMENTS

| | | | |
|---|---|---|---|
| 2007/0101965 A1* | 5/2007 | Asahara | F02D 35/024 477/3 |
| 2014/0195116 A1* | 7/2014 | Hrovat | B60W 30/143 701/38 |
| 2019/0291565 A1* | 9/2019 | Kasahara | B60W 20/10 |

(Continued)

FOREIGN PATENT DOCUMENTS

| | | |
|---|---|---|
| JP | 2021-060027 A | 4/2021 |
| JP | 2022-129127 A | 9/2022 |

*Primary Examiner* — Adam M Alharbi
(74) *Attorney, Agent, or Firm* — Finnegan, Henderson, Farabow, Garrett, and Dunner, LLP

(57) ABSTRACT

During the execution of the combustion stopping process for continuing the combustion of the remaining cylinders while the combustion of some of the plurality of cylinders provided in the engine is stopped, the first vibration damping process for generating the vibration damping torque in the first rotary electric machine M1 and the second vibration damping process for generating the vibration damping torque in the second rotary electric machine M2 are executed.

7 Claims, 6 Drawing Sheets

(51) Int. Cl.
    *B60W 30/192*    (2012.01)
    *B60W 30/20*    (2006.01)

(56) References Cited

U.S. PATENT DOCUMENTS

2021/0107452 A1    4/2021  Nose et al.
2022/0266814 A1    8/2022  Nose et al.

* cited by examiner

… (1)

CONTROL DEVICE OF HYBRID ELECTRIC VEHICLE FOR IMPLEMENTING VIBRATION DAMPING FOR THE VEHICLE BODY USING ELECTRIC MOTORS

CROSS-REFERENCE TO RELATED APPLICATION

This application claims priority to Japanese Patent Application No. 2022-filed on Jun. 30, 2022, incorporated herein by reference in its entirety.

BACKGROUND

1. Technical Field

The present disclosure relates to a control device of a hybrid electric vehicle.

2. Description of Related Art

As a control device of a hybrid electric vehicle, a device described in Japanese Unexamined Patent Application Publication No. 2021-60027 (JP 2021-60027 A) is known. In the hybrid electric vehicle in which the control device is a control target, the hybrid electric vehicle includes an engine having a plurality of cylinders, a first rotary electric machine, a second rotary electric machine, and a power split mechanism. In addition, the hybrid electric vehicle is configured such that the engine and the first rotary electric machine are drivingly connected to a drive shaft of wheels, respectively, via the power split mechanism, and the second rotary electric machine is drivingly connected to a drive shaft of wheels not via the power split mechanism.

The control device of Document 1 applied to such a hybrid electric vehicle performs a combustion stop process of continuing combustion of the remaining cylinders while the combustion of a part of the plurality of cylinders is stopped, thereby raising the temperature of a catalytic device and a filtering device for exhaust gas control. When the combustion stop process is performed, the torque fluctuation of the engine increases, and the vehicle body vibration increases. On the other hand, the control device suppresses an increase in the vehicle body vibration caused by the combustion stop process by supplementing a torque decrease amount caused by the combustion stop of a part of the cylinders with the second rotary electric machine.

SUMMARY

However, there is a possibility that the vehicle body vibration cannot be sufficiently suppressed only by compensating for the torque decrease with the second rotary electric machine.

A control device of a hybrid electric vehicle for solving the above problem is
a device that controls a hybrid electric vehicle including
an engine including a plurality of cylinders,
a first rotary electric machine, a second rotary electric machine, a power split mechanism, and
an in-vehicle battery electrically connected to the first rotary electric machine and the second rotary electric machine,
in which the control unit controls the hybrid electric vehicle in which the engine and the first rotary electric machine are drivingly connected to a drive shaft of wheels via the power split mechanism, and the second rotary electric machine is connected to a drive shaft of the wheels without the power split mechanism.

The control device performs the following processing:
a combustion stop process of continuing combustion of remaining cylinders in a state in which combustion of a part of the plurality of cylinders is stopped;
a first vibration damping process of generating, in the first rotary electric machine, a vibration damping torque for suppressing vehicle body vibration associated with an execution of the combustion stop process;
a second vibration damping process of generating, in the second rotary electric machine, the vibration damping torque for suppressing the vehicle body vibration associated with the execution of the combustion stop process; and
an adjusting process of adjusting an amplitude of the vibration damping torque generated in the second vibration damping process to an increasing side when an engine rotational speed is high, and adjusting an amplitude of the vibration damping torque generated in the first vibration damping process to an increasing side when the engine rotational speed is low.

When the combustion stop process is performed, the torque fluctuation of the engine increases. Then, the vibration caused by the torque fluctuation of the engine is transmitted to the vehicle body, which leads to an increase in the vehicle body vibration. The transmission path of the vibration to the vehicle body includes a path transmitted from the engine to the vehicle body via a mount, and a path from the engine to the vehicle body via the power split mechanism and the drive shaft of the wheels. Among them, the transmission of the vibration through the path passing through the mount of the engine is effectively suppressed by the first vibration damping process. In addition, the transmission of the vibration through the path passing through the drive shaft of the wheels is effectively suppressed by the second vibration damping process. Note that the suppression effect of the vehicle body vibration by the first vibration damping process and the second vibration damping process is enhanced by increasing the amplitude of the vibration suppression torque generated in each of the first and second vibration damping processes.

When the engine rotational speed is low, the strength of the vibration transmitted to the vehicle body through the path passing through the mount is larger than the strength of the vibration transmitted to the vehicle body through the path passing through the drive shaft. At this time, when the amplitude of the vibration damping torque in the first vibration damping process is increased, the effect of suppressing the vehicle body vibration is greatly improved. On the other hand, when the engine rotational speed is high, the strength of the vibration transmitted to the vehicle body through the path passing through the drive shaft is larger than the strength of the vibration transmitted to the vehicle body through the path passing through the mount. At this time, when the amplitude of the vibration damping torque in the second vibration damping process is increased, the effect of suppressing the vehicle body vibration is greatly improved. Therefore, the control device of hybrid electric vehicle is highly effective in suppressing the vehicle body vibration caused by the combustion stop process.

In the control device of the hybrid electric vehicle described above, the first vibration damping process may be configured to be a process of generating the vibration damping torque such that a torque of the first rotary electric machine decreases at the same cycle as a cycle of a torque decrease of the engine due to a combustion stop of the part of the cylinders. In this case, the generation of the vibration damping torque in the first vibration damping process is accompanied by an increase in the charging current of the in-vehicle battery.

In the adjusting process in the case where the first vibration damping process is configured as described above, the configuration may be such that when the charging rate of the in-vehicle battery is high, the amplitude of the vibration damping torque generated in the first vibration damping process becomes smaller than that in the case in which the same charging rate is low. In such a case, overcharging of the in-vehicle battery can be suppressed. Further, in the adjusting process in such a case, the configuration may be such that when the charging rate of the in-vehicle battery is high, the amplitude of the vibration damping torque generated in the second vibration damping process becomes larger than that in the case in which the same charging rate is low.

As described above, in the adjusting process in the case where the first vibration damping process is configured, when the temperature of the in-vehicle battery is low, the amplitude of the vibration damping torque generated in the first vibration damping process may be configured to be smaller than that in the case where the temperature is high. When the temperature of the in-vehicle battery is low, the charging and discharging capability of the in-vehicle battery decreases. The generation of the vibration damping torque in the first vibration damping process is more likely to be restricted by a decrease in the charge/discharge capability than the generation of the vibration damping torque in the second vibration damping process. Therefore, when the temperature of the in-vehicle temperature is low, it is desirable to reduce the amplitude of the vibration damping torque generated in the first vibration damping process. Further, the adjusting process in such a case may be configured to increase the amplitude of the vibration damping torque generated in the second vibration damping process when the temperature of the in-vehicle battery is low than when the temperature is high.

In the control device in which the first vibration damping process is configured as described above, the adjusting process may be configured to cause the amplitude of the vibration damping torque generated in the second vibration damping process to be larger when charging of the in-vehicle battery is continued for a predetermined time or more than when charging of the in-vehicle battery is not continued for the predetermined time or more. When the charging lasts longer than a certain amount of time, the charging capacity of the in-vehicle battery decreases. When the charging capacity of the in-vehicle battery decreases, there is a case in which the generation of the vibration damping torque in the first vibration damping process is limited. On the other hand, even when the charging capacity of the in-vehicle battery decreases, the generation of the vibration damping torque in the second vibration damping process is unlikely to be limited. Thus, even when the charging capacity of the in-vehicle battery decreases due to the charging being continued, the effect of suppressing the vibration of the vehicle body hardly decreases.

In the control device in which the first vibration damping process is configured as described above, the adjusting process may be configured to cause the amplitude of the vibration damping torque generated in the first vibration damping process to be larger when discharging of the in-vehicle battery is continued for a predetermined time or more than when discharging of the in-vehicle battery is not continued for the predetermined time or more. When the discharging lasts longer than a certain amount of time, the discharging capacity of the in-vehicle battery decreases. When the discharging capacity of the in-vehicle battery decreases, there is a case in which the generation of the vibration damping torque in the first vibration damping process is limited. On the other hand, even when the discharging capacity of the in-vehicle battery decreases, the generation of the vibration damping torque in the second vibration damping process is unlikely to be limited. Thus, even when the discharging capacity of the in-vehicle battery decreases due to the discharging being continued, the effect of suppressing the vibration of the vehicle body hardly decreases.

In the adjusting process of a case in which the first vibration damping process is configured as described above, the configuration may be such that when an integrated current of the in-vehicle battery is large, the adjusting process adjusts the amplitude of the vibration damping torque generated in the first vibration damping process to an increasing side and the amplitude of the vibration damping torque generated in the second vibration damping process to a decreased side. In such a case, the increase in the integrated current value enables effective suppression of the vehicle body vibration while suppressing further temperature increase of the electric circuit component in a state where the electric circuit component becomes high temperature.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hybrid Electric Vehicle Drive System Configuration

Hereinafter, an embodiment of a control device of a hybrid electric vehicle will be described referring to FIG. 1 to FIG. 7.

Figure 1:
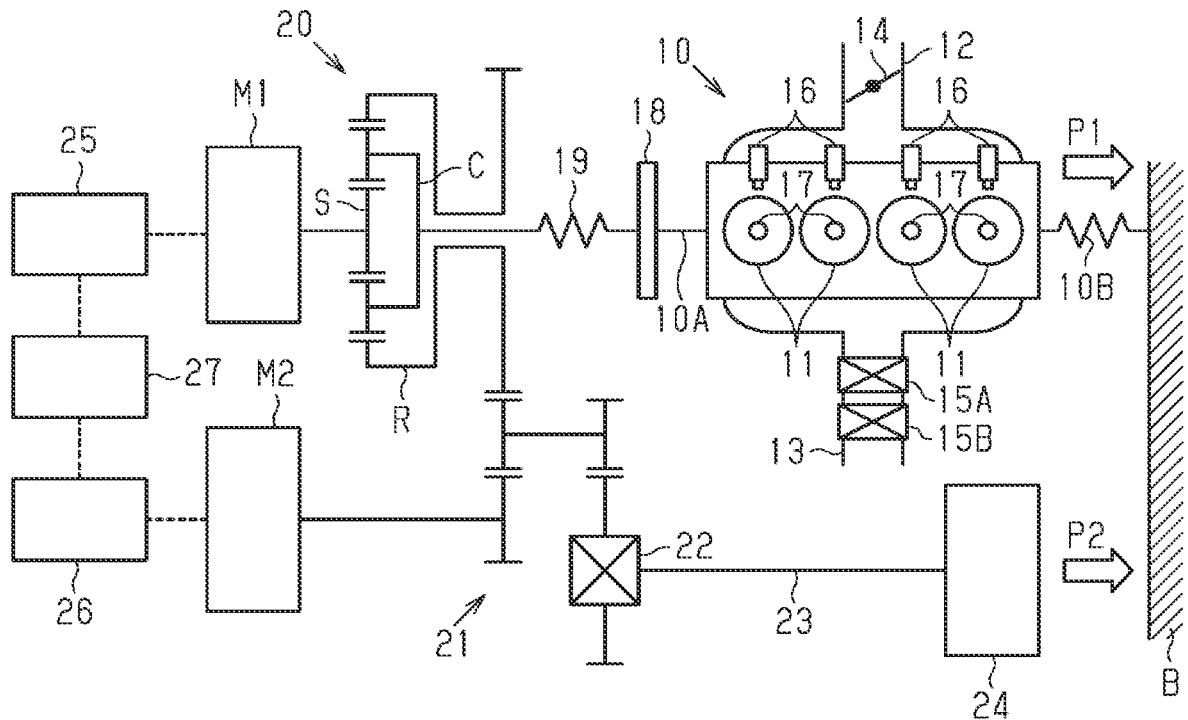
FIG. 1 is a diagram schematically showing a configuration of a drive system of a hybrid electric vehicle to which the control device is applied for an embodiment of a control device of a hybrid electric vehicle.

First, referring to FIG. 1, a configuration of a drive system of a hybrid electric vehicle to be controlled by the control device 30 of the present embodiment will be described. As illustrated in FIG. 1, hybrid electric vehicle includes an engine 10, a first rotary electric machine M1, and a second rotary electric machine M2. The engine 10 is a heat engine that generates power by burning fuel. The engine 10 is suspended from the vehicle body B via an engine mounting 10B. The first rotary electric machine M1 and the second rotary electric machine M2 have both a function as an electric motor that generates power by receiving electric power and a function as a generator that generates power by receiving power from the outside.

The engine 10 includes a plurality of cylinders 11 that perform combustion, an intake passage 12 that is an introduction passage of intake air to each cylinder 11, and an exhaust passage 13 that is an exhaust passage of exhaust gas from each cylinder 11. In addition, the engine 10 includes a crankshaft 10A that serves as a power take-out shaft. A throttle valve 14 for adjusting an intake air amount of each cylinder 11 is installed in the intake passage 12. A catalytic device 15A on which a three-way catalyst is supported is installed in the exhaust passage 13. In addition, a filtering device 15B that collects Particulate Matter (PM in the exhaust gas is installed in a part of the exhaust passage 13 downstream of the catalytic device 15A. Further, in the engine 10, an injector 16 for injecting fuel into the intake air introduced into each cylinder 11 is installed for each cylinder. An ignition device 17 is installed in each cylinder 11 of the engine 10. The ignition device 17 ignites an air-fuel mixture of the intake air introduced through the intake passage 12 and the fuel injected by the injector 16 by spark discharge. Combustion energy of the air-fuel mixture in the respective cylinders 11 is converted into rotational energy in the crankshaft 10A.

Hybrid electric vehicle includes a power split mechanism 20. The power split mechanism 20 includes a planetary gear composed of three rotating elements: a sun gear S, a planetary carrier C, and a ring gear R. A crankshaft 10A of the engine 10 is connected to the planetary carrier C via a flywheel 18 and a torsional damper 19. A first rotary electric machine M1 is connected to the sun gear S. A drive shaft 23 of the wheel 24 is connected to the ring gear R via a reduction mechanism 21 and a differential mechanism 22. The second rotary electric machine M2 is connected to the speed reduction mechanism 21. In such a hybrid electric vehicle, the engine 10 and the first rotary electric machine M1 are drivingly connected to the drive shaft 23 of the wheel 24, respectively, via the power split mechanism 20, and the second rotary electric machine M2 is not via the power split mechanism 20.

On the other hand, the first rotary electric machine M1 is electrically connected to the vehicle-mounted batteries 27 via the first inverters 25. The second rotary electric machine M2 is connected to the vehicle-mounted batteries 27 via the second inverters 26. Each of the first inverter 25 and the second inverter 26 is a power conversion circuit that converts a terminal voltage of the in-vehicle battery 27, which is a DC voltage source, into an AC voltage and outputs the AC voltage.

Configuration of the Control Device 30

Figure 2:
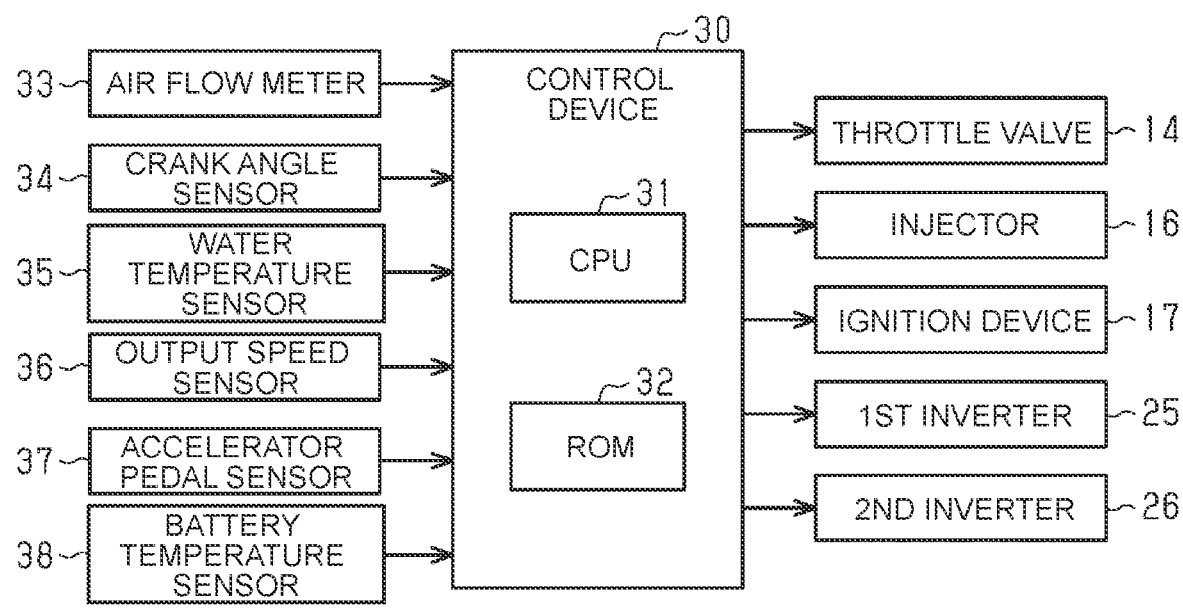
FIG. 2 is a diagram schematically illustrating a configuration of a control device according to the embodiment.

Next, referring to FIG. 2, a configuration of the control device 30 that controls hybrid electric vehicle will be described. The control device 30 performs torque control of each of the engine 10, the first rotary electric machine M1, and the second rotary electric machine M2. The control device 30 operates the throttle valve 14, the injector 16, and the ignition device 17 installed in the engine 10 to control the torque of the engine 10. In addition, the control device 30 operates the first inverter 25 to control the torque of the first rotary electric machine M1. Further, the control device 30 operates the second inverter 26 to control the torque of the second rotary electric machine M2.

The control device 30 receives detection signals of an air flow meter 33, a crank angle sensor 34, and a water temperature sensor 35 installed in the engine 10. The air flow meter 33 is a sensor that detects an intake air flow rate GA of the intake passage 12 of the engine 10. The crank angle sensor 34 is a sensor that detects a crank angle that is a rotational angle of the crankshaft 10A. The water temperature sensor 35 is a sensor that detects an engine water temperature THW that is the temperature of the engine coolant. The control device 30 also receives detection signals of the output rotation speed sensor 36, the accelerator pedal sensor 37, and the battery temperature sensor 38. The output rotation speed sensor 36 is a sensor that detects an output rotational speed NP that is a rotational speed of the ring gear R. The accelerator pedal sensor 37 is a sensor that detects an accelerator pedal operation amount ACC that is an operation amount of an accelerator pedal by an occupant of hybrid electric vehicle. The battery temperature sensor 38 is a sensor that detects a battery temperature THB that is a temperature of the in-vehicle battery 27.

The control device 30 includes a CPU 31 and a ROM 32. The control device 30 controls the torques of the engine 10, the first rotary electric machine M1, and the second rotary electric machine M2 by CPU 31 executing the programs stored in ROM 32.

Adjusting Hybrid Electric Vehicle Drive Force

Next, a process executed by CPU 31 to adjust the driving force of hybrid electric vehicle will be described. Note that the processing described here is processing during normal operation of the engine 10 in a case where the combustion stop processing described later is not performed.

When adjusting the driving force, CPU 31 first calculates the required driving torque TD* based on the accelerator pedal-operation-amount ACC and the output-rotation-speed NP. Further, CPU 31 calculates the required driving force PD* based on the required driving torque TD* and the output rotational speed NP. The required driving torque TD* is the required driving torque of hybrid electric vehicle. The required driving force PD* is a required value of the driving force of hybrid electric vehicle.

Subsequently, CPU 31 calculates the charge/discharge required power PB* of the in-vehicle battery 27. The charge/discharge required power PB* is set in accordance with the deviation between the charging rate SOC of the in-vehicle battery 27 and the target charging rate that is the target value. In the charge/discharge required power PB*, a positive value is set when the charging rate SOC is larger than the target charging rate, and a negative value is set when the charging rate SOC is smaller than the target charging rate.

Next, CPU 31 calculates a value obtained by subtracting the charge/discharge required power PB* from the required driving force PD* as a value of the engine required power PE*. The engine required power PE* represents a required power generated by the engine 10.

Next, CPU 31 selects an operating point on the operating line of the engine 10 capable of generating power corresponding to the engine required power PE*, which is advantageous in terms of fuel consumption performance and exhaust performance. Then, CPU 31 sets the engine rotational speed NE and the engine load factor KL of the selected operating point to the target engine rotational speed NE* and the target engine load factor KL*, respectively. Note that the engine-load factor KL represents the charging rate of the intake air of the cylinder 11.

Subsequently, CPU 31 operates the opening degree of the throttle valve 14 so as to bring the engine load factor KL* closer to the target engine load factor. CPU 31 calculates an actual engine load factor KL based on the engine rotational speed NE and the intake air flow rate GA. The engine-speed NE is calculated by CPU 31 on the basis of the crank-angle sensor 34. In addition, CPU 31 calculates, as the fuel injection amount of the injector 16, an amount in which the air-fuel ratio of the air-fuel mixture burned in the cylinder 11 becomes the target air-fuel ratio based on the engine-load factor KL. Then, CPU 31 operates the injectors 16 of the respective cylinders 11 so as to perform fuel injection corresponding to the calculated fuel injection quantity.

In addition, CPU 31 sets the first required torque TM1* based on the deviation of the engine rotational speed NE* with respect to the target engine rotational speed. The first required torque TM1* represents a required torque for the first rotary electric machine M1. More specifically, CPU 31 performs feedback-adjustment of the first required torque TM1* so as to bring the deviation close to "0". Then, CPU 31 operates the first inverter 25 so as to generate a torque corresponding to the first required torque TM1* in the first rotary electric machine M1.

On the other hand, CPU 31 calculates the second required torque TM2* based on the required drive torque TD* and the direct torque TED. The second required torque TM2* represents a required torque for the second rotary electric machine M2. The direct torque TED represents the torque actually outputted from the power split mechanism 20 to the speed reduction mechanism 21. CPU 31 calculates the direct torque TED based on the first required torque TM1*, etc. Then, CPU 31 operates the second inverter 26 so as to generate a torque corresponding to the second required torque TM2*, on the second rotary electric machine M2.

Filter Regeneration Control

The filtering device 15B installed in the exhaust passage 13 of the engine 10 may cause clogging due to the accumulation of PM. CPU 31 performs filter regeneration control to regenerate the filtering device 15B by purifying the deposited PM prior to clogging of the filtering device 15B.

Figure 3:
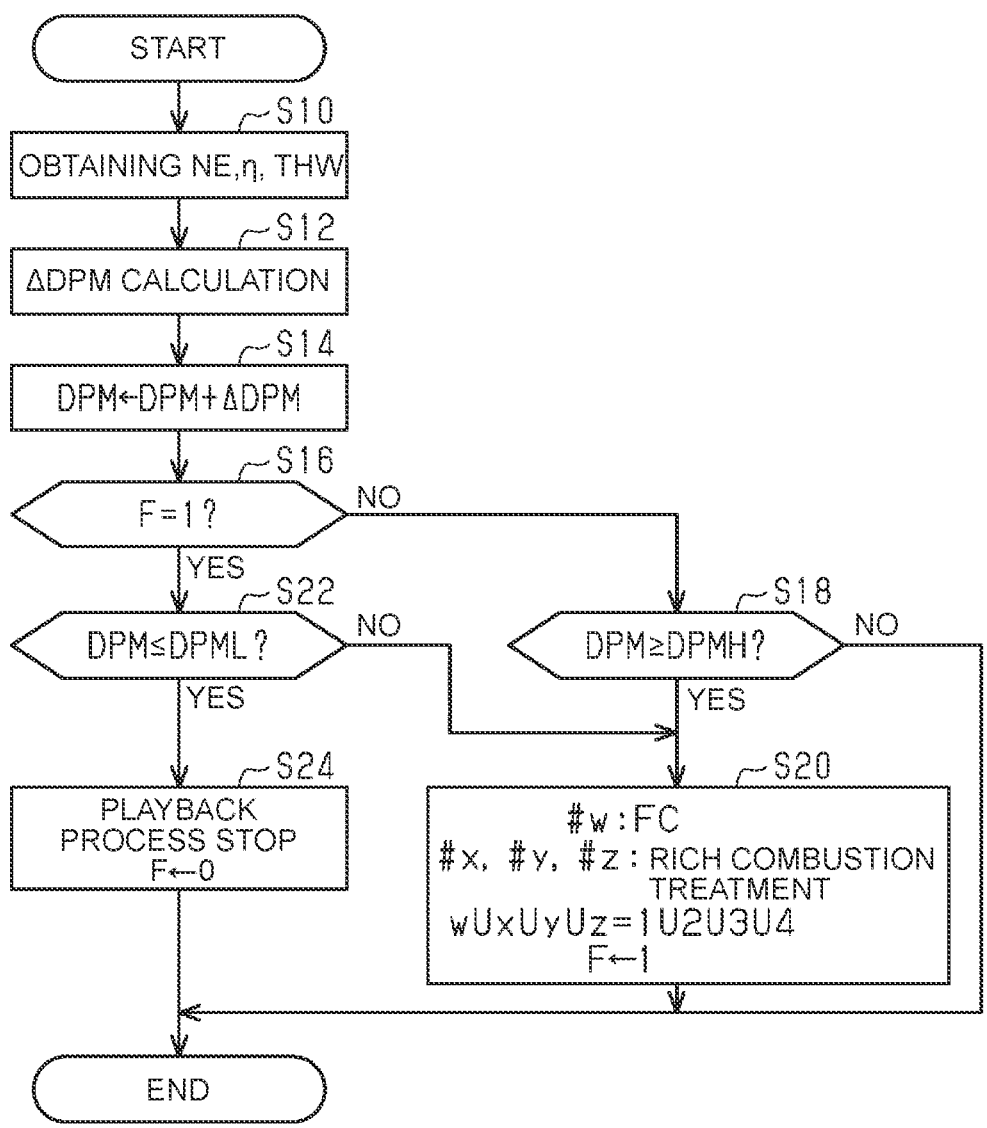
FIG. 3 is a flowchart illustrating a processing procedure of filter regeneration control executed by the control device.

FIG. 3 shows the procedure of the filter regeneration control. The process illustrated in FIG. 3 is realized by CPU 31 repeatedly executing the program stored in ROM 32 every predetermined control cycle. In the following, the step number of each process is represented by a number prefixed with "S".

In the series of processes illustrated in FIG. 3, CPU 31 first acquires the engine rotational speed NE, the fill efficiency η, and the engine water temperature THW (S10). The engine-speed NE is calculated by CPU 31 based on the output-signal of the crank angle sensor 34. The fill rate q is calculated by CPU 31 based on the intake air flow rate GA and the engine rotational speed NE. Next, CPU 31 calculates an updated amount ΔDPM of the accumulated amount DPM, which is the amount of PM collected in the filtering device 15B, based on the engine rotational speed NE, the till efficiency η, and the engine water temperature THW (S12).

Here, CPU 31 calculates the quantity of PM in the exhaust gas discharged to the exhaust passage 13 based on the engine rotational speed NE, the charge efficiency η, and the engine water temperature THW. In addition, CPU 31 calculates the temperature of the filtering device 15B based on the engine-speed NE and the charge efficiency η. CPU 31 then calculates an updated amount ΔDPM based on the amount of PM in the evacuation and the temperature of the filtering device 15B. Note that CPU 31 may calculate the updated quantity ΔDPM by taking into consideration the air-fuel ratio in the cylinder that continues the combustion control during the process of S20 described later.

Next, CPU 31 updates the accumulated amount DPM according to the update amount ΔDPM (S14). Next, CPU 31 determines whether or not the flag F is "1" (S16). When the flag F is "1", the flag F indicates that a regeneration process for burning out PM of the filtering device 15B is being performed, while when the flag F is "0", it indicates that the regeneration process is not performed. When CPU 31 determines that the value is "0" (S16: NO), it determines whether or not the accumulated amount DPM is equal to or greater than the reproduction-execution-value DPMH (S18). The reproduction execution value DPMH is set to a value at which PM quantity collected by the filtering device 15B is increased and it is desired to remove PM. When CPU 31 determines that it is equal to or larger than the reproduction execution-value DPMH (S18: YES), it executes a reproduction process and assigns "1" to the flag F (S20). That is, CPU 31 stops the injection of the fuel from the injector 16 of any one of the four cylinders 11. Further, CPU 31 sets the air-fuel ratio of the air-fuel mixture in the remaining cylinders to be richer than the stoichiometric air-fuel ratio. This process is a process for discharging oxygen and unburned fuel into the exhaust passage 13 and increasing the temperature of the filtering device 15B to burn and remove PM collected by the filtering device 15B. That is, by discharging oxygen and unburned fuel into the exhaust passage 13, the unburned fuel is burned in the catalytic device 15A or the like to raise the temperature of the exhaust gas. This allows the filtering device 15B to be heated up. Further, by supplying oxygen to the filtering device 15B, PM collected by the filtering device 15B can be burned and removed.

CPU 31 periodically switches between cylinders for stopping the injection of fuel. The switching cycle is, for example, a predetermined number of times one combustion cycle. Here, the predetermined number may be, for example, a number equal to or larger than 100.

On the other hand, when CPU 31 determines that the flag F is "1" (S16: YES), it determines whether or not the accumulated amount DPM is equal to or less than the stopping-threshold DPML (S22). The stopping thresholds DPML are set such that the quantity of PM collected in the filtering device 15B is sufficiently small and the regeneration process may be stopped. When CPU 31 determines that the threshold value exceeds the threshold value DPML for stopping (S22: NO), the process proceeds to S20 process, and when it is determined that the threshold value is equal to or less than the threshold value DPML for stopping (S22: YES), the reproduction process is stopped and "0" is substituted for the flag F (S24).

Damping Control

Note that CPU 31 ends the series of processes shown in FIG. 3 once when S20, S24 process is completed and when a negative determination is made in S18 process. During the execution of the combustion stop process in the filter regeneration control, the combustion torque is not generated at the time when the cylinder 11 that has stopped the combustion performs the original combustion, and thus the torque of the engine 10 decreases. On the other hand, since the planetary carrier C attempts to maintain the rotation speed up to that point due to inertia, the torsion of the torsional damper 19 increases. When the combustion is performed in the cylinder 11 that enters the combustion stroke next to the cylinder 11 that has stopped the combustion, the torque of the engine 10 increases. At this time, the torsion stored in the torsional damper 19 is released, and the engine 10 vibrates. Then, the vibrations of the engine 10 are transmitted to the vehicle body B through the engine mounting 10B.

The torque fluctuation of the engine 10 caused by the execution of the combustion stop process is also transmitted to the drive shaft 23 of the wheel 24 via the power split mechanism 20, the speed reduction mechanism 21, and the differential mechanism 22. As a result, spots are formed in the rotation of the wheels 24, and longitudinal vibration of the vehicle body B is generated.

In this way, during the execution of the combustion stop process, the vibration caused by the torque fluctuation of the engine 10 is transmitted to the vehicle body B through the two paths, thereby increasing the vehicle body vibration. In the following explanation, a transmission path of vibrations to the vehicle body B through the engine-mount 10B is referred to as a mounting path P1. Further, a transmission path of vibrations to the vehicle body B through the drive shaft 23 of the wheel 24 is referred to as a drive shaft path P2.

CPU 31 executes vibration damping control for generating vibration damping torque for suppressing vibration transmission to the vehicle body B to each of the first rotary electric machine M1 and the second rotary electric machine M2 during the execution of the combustion stopping process. Hereinafter, the vibration suppression control will be described in detail.

Figure 4:
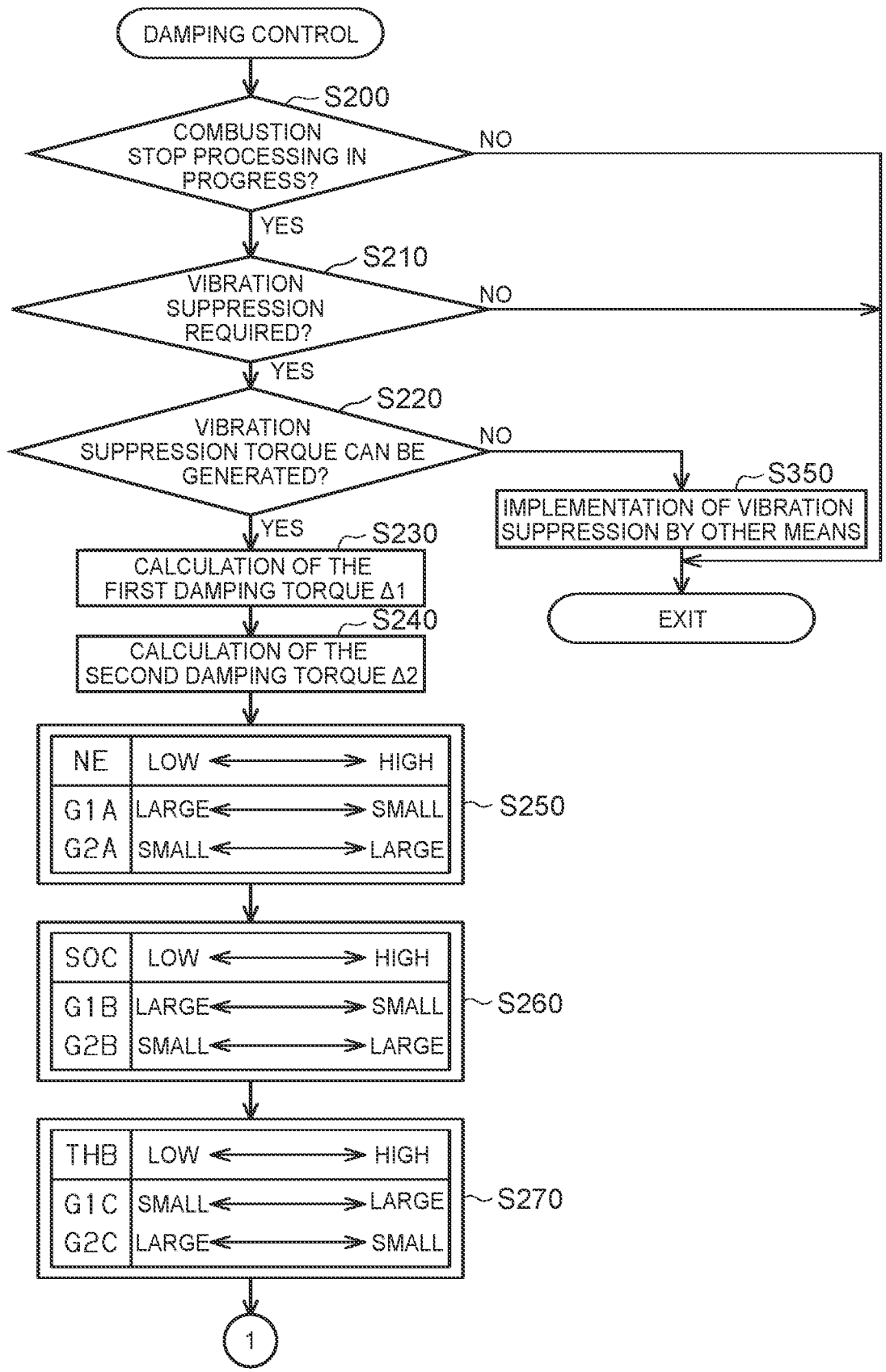
FIG. 4 is a flowchart illustrating a part of a processing procedure of the vibration suppression control executed by the control device.
Figure 5:
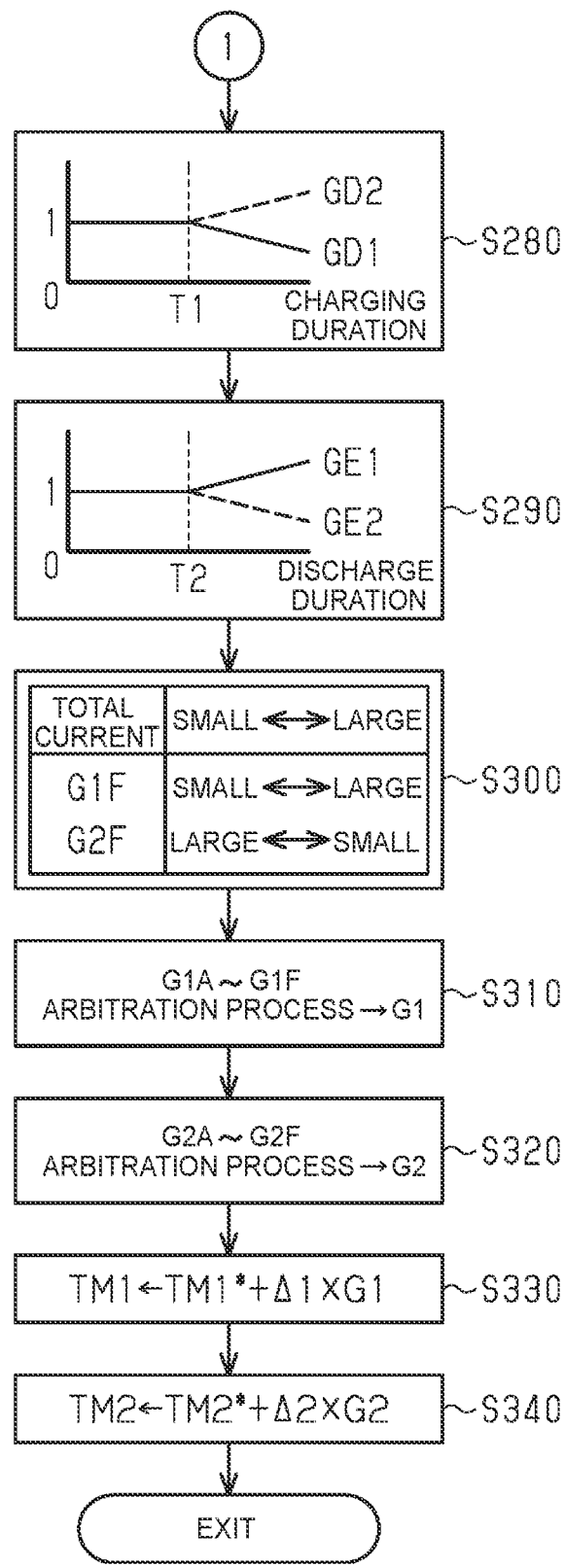
FIG. 5 is a flowchart showing the remaining part of the processing procedure of the vibration suppression control.
Figure 6:
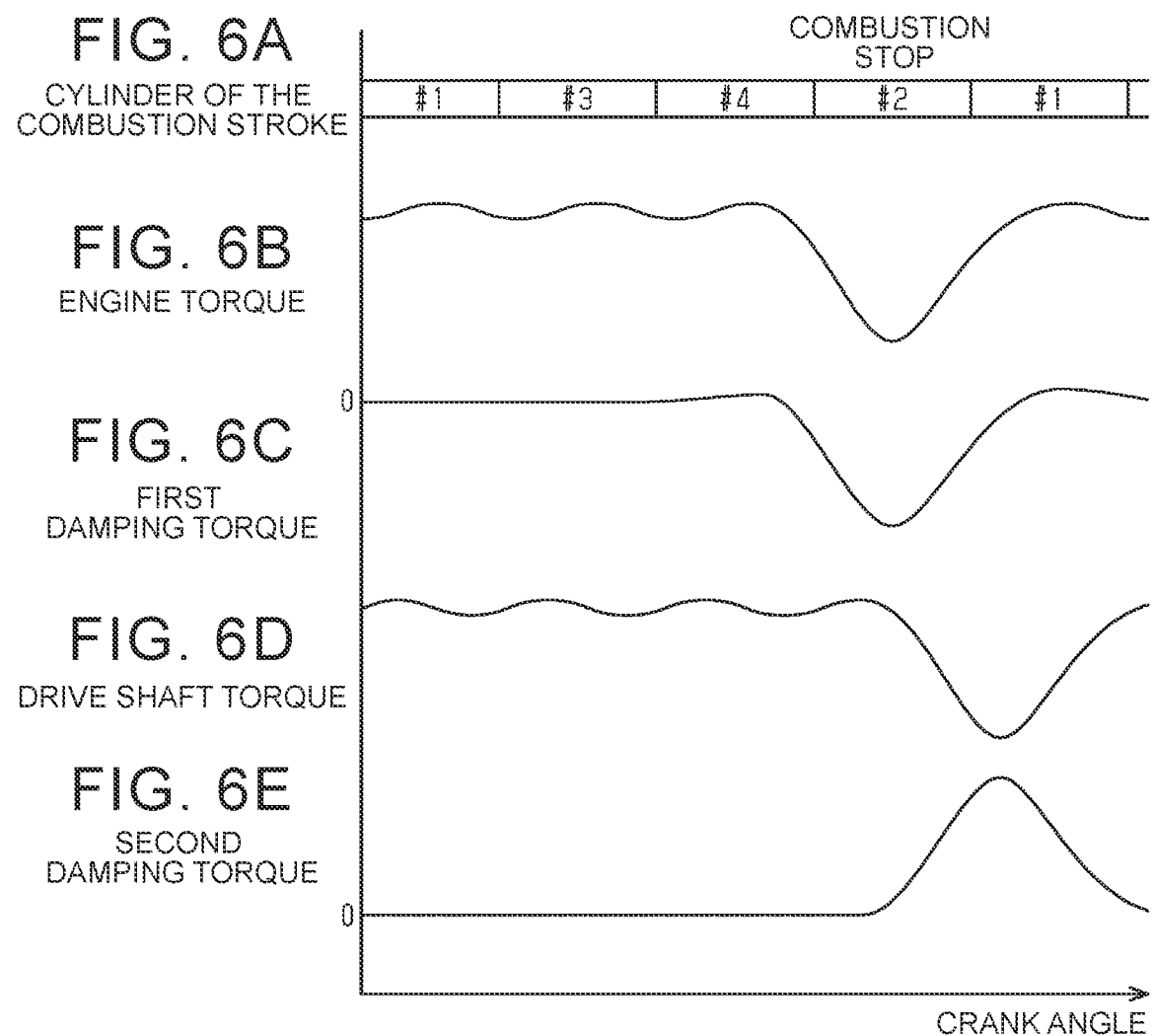
FIG. 6A is a time chart showing the transition of the cylinder number of the cylinder during the combustion stroke during the execution of the combustion stop process.
FIG. 6B is an illustrating the transition of the crankshaft torque during the execution of the combustion stop process.
FIG. 6C is an illustrating a time chart of a transition of a first damping torque during a combustion stop process.
FIG. 6D is a time chart showing the change in driveshaft torque during the combustion stop process.
FIG. 6E is an illustrating a time chart of a transition of the second damping torque during the execution of the combustion stop process.

FIG. 4 and FIG. 5 show the procedure of the damping control. The processes illustrated in FIGS. 4 and 5 are realized by CPU 31 repeatedly executing the programs stored in ROM 32 at predetermined control cycles.

In the series of processes illustrated in FIGS. 4 and 5, CPU 31 first determines whether or not the combustion stop process is being executed (S200). That is, CPU 31 determines whether or not the flag F is "1". When the combustion stop process is being executed (S200: YES), CPU 31 determines whether or not vibration damping is necessary based on the engine-speed NE and the filling-efficiency η (S210). When the engine-speed NE is higher, even if the combustion stopping process is executed, the period in which the combustion torque is reduced is short, so that the vehicle body vibration is hardly conspicuous. In addition, when the filling efficiency η is small, the combustion torque is small even when the combustion stop process is executed, so that the vehicle body vibration is hardly conspicuous. Therefore, CPU 31 determines that damping is not necessary in these cases.

When it is determined that the damping is necessary (S210: YES), CPU 31 determines whether or not the vibration damping torque can be generated by the first rotary electric machine M1 and the second rotary electric machine M2 (S220). The condition in which the vibration damping torque cannot be generated is, for example, a condition in which the electric system of hybrid electric vehicle is abnormal or the electric system cannot be sufficiently cooled. When the vibration damping torque cannot be generated (S220: NO), CPU 31 performs vibration suppression of the vehicle body vibration by means other than the generation of the vibration damping torque, such as a change of the operating point of the engine 10 (S350).

On the other hand, when it is S220: YES to generate the vibration damping torque, CPU 31 calculates the first damping torque Δ1, which is the vibration damping torque generated in the first rotary electric machine M1 (S230). Further, CPU 31 calculates a second damping torque Δ2 which is a damping torque generated in the second rotary electric machine M2 (S240).

6B shows the transition of the engine torque during the combustion stop process. The diagram 6C shows the transition of the first damping torque Δ1 calculated by CPU 31. Further, 6D shows the transition of the drive shaft torque, which is the torque of the drive shaft 23 of the wheel 24. 6E shows the transition of the second damping torque Δ2 calculated by CPU 31. Note that in 6A of the drawing, the cylinder number of the cylinder 11 during the combustion stroke is shown. In 6A and 6E of the drawings, the engine 10 has four cylinders 11 having cylinder numbers #1, #2, #3, and #4, and the combustion of the cylinder 11 having the cylinder number #2 is stopped by the combustion stopping process. FIG. A shows 6E when the burning order of the cylinders 11 is in the order of #1→#3→#4→#2.

As shown in 6B, the engine torque decreases after the start of the combustion stroke of the cylinder 11 having the cylinder number #2 in which the combustion is stopped. As shown in 6C, CPU 31 sets the value of the first damping torque Δ1 such that the value becomes "0" except for the period of decrease in the engine torque, and the period of decrease in the engine torque becomes a value decreasing in the same period as the period of decrease in the engine torque. In the present embodiment, CPU 31 calculates the first damping torque Δ1 on the basis of the engine rotational speed NE, the engine load factor KL, and the cylinder number of the cylinder 11 stopping the burning. Then, CPU 31 calculates the value of the first damping torque Δ1 so as to have a value larger than the value when the amplitude of the variation of the engine torque due to the execution of the combustion stop process is large. In this way, CPU 31 sets the first damping torque Δ1 by the feedforward.

As shown in 6D, the drive shaft torque during the combustion stop process decreases later than the decrease in the engine torque. As shown in 6E, CPU 31 sets the value of the second damping torque Δ2 such that the value becomes "0" except for the period of decrease in the drive shaft torque, and the period of decrease in the drive shaft torque becomes a value that increases in conjunction with the decrease in the drive shaft torque. In other words, a positive value is set to the second damping torque Δ2 in the period in which the drive shaft torque decreases. In the present embodiment, CPU 31 calculates the drive shaft torque from the output rotation speed sensor 36. CPU 31 calculates the second damping torque Δ2 based on the calculated drive shaft torque. Specifically, CPU 31 calculates the value of the second damping torque Δ2 so as to have a value larger than that of the case where the same amplitude is smaller when the amplitude of the variation of the drive shaft torque accompanying the execution of the combustion stop process is large. In this way, CPU 31 sets the second damping torque Δ2 by feedback based on the drive shaft torque.

In the series of processes illustrated in FIGS. 4 and 5, CPU 31 sets the gain G1A applied to the first damping torque Δ1 and the gain G2A applied to the second damping torque Δ2 based on the engine rotational speed NE after calculating the second damping torque Δ2 in S240 (S250). CPU 31 sets the gain G1A to a value greater than or equal to "0" and greater than when the engine-speed NE is lower than when it is higher. On the other hand, CPU 31 sets the gain G2A to a value equal to or greater than "0" and to a value greater than that when the engine-speed NE is higher than when the engine-speed is lower.

Next, CPU 31 sets the gain G1B applied to the first damping torque Δ1 and the gain G2B applied to the second damping torque Δ2 based on the charging rate SOC of the in-vehicle battery 27 (S260). CPU 31 sets the gain G1A to a value equal to or greater than "0" and to a value smaller than the value when the charging rate SOC is high. In addition, CPU 31 sets the gain G2B to be a value of "0" or more, and to be a larger value when the charging rate SOC is high than when it is low.

Next, CPU 31 sets the gain G1C applied to the first damping torque Δ1 and the gain G2C applied to the second damping torque Δ2 based on the battery temperature THB (S270). CPU 31 sets the gain G1C to a value greater than or equal to "0" and greater than when the battery temperature THB is higher than when it is lower. In addition, CPU 31 sets the gain G2C to a value of "0" or more, and to a value smaller than the value when the battery-temperature THB is higher than the value when the battery-temperature is lower.

Next, CPU 31 sets the gain G1D applied to the first damping torque Δ1 and the gain G2D applied to the second damping torque Δ2 based on the charge duration (S280). When the charge duration is less than the predetermined time T1, CPU 31 sets the gain G1D and the gain G2D to "1". When the charging duration is equal to or longer than the predetermined time T1, CPU 31 takes a value of "0" or more, and sets the gain G1D so as to gradually decrease from "1" in accordance with an increase in the charging duration from the predetermined time T1. Further, CPU 31 sets the gain G2D so as to gradually increase from "1" in accordance with an increase in the charging duration from the predetermined time T1 when the charging duration is equal to or longer than the predetermined time T1.

Next, CPU 31 sets the gain G1E applied to the first damping torque Δ1 and the gain G2E applied to the second damping torque Δ2 based on the discharging duration (S290). When the discharging duration is less than the predetermined time T2, CPU 31 sets the gain G1E and the gain G2E to "1". When the discharge duration is equal to or longer than the predetermined time T2, CPU 31 sets the gain G1E so as to gradually increase from "1" in accordance with an increase in the discharge duration from the predetermined time T2. Further, CPU 31 takes a value of "0" or more when the discharge duration is equal to or longer than the predetermined time T2, and sets the gain G2E so as to gradually decrease from "1" in accordance with the increase of the discharge duration from the predetermined time T2.

Next, CPU 31 sets the gain G1F applied to the first damping torque Δ1 and the gain G2F applied to the second damping torque Δ2 based on the integrated current of the in-vehicle battery 27 (S300). The integrated current is an integrated value of the charging current and the discharging current of the in-vehicle battery 27 in a predetermined period up to the present. CPU 31 sets the gain GIF to a value of "0" or more, and to a value larger than the value when the integrated current is large than when the integrated current is small. In addition, CPU 31 sets the gain G2F to a value of "0" or more, and to a value smaller than the value when the integrated current is large.

Subsequently, CPU 31 performs an G1F arbitration process from the respective gains G1A applied to the first damping torque Δ1, and finally sets the first gain G1 to be applied to the first damping torque Δ1 (S310). In the adjusting process, CPU 31 selects the highest-priority value among G1F from the gain G1A and sets the selected value as the value of the first gain 01. Further, CPU 31 performs an arbitration process on G2F from the gain G2A applied to the second damping torque Δ2 to set the second gain G2 (S320).

Subsequently, CPU 31 adds the first damping torque Δ1 multiplied by the first gain G1 to the first required torque TM1*. Then, CPU 31 calculates the added value as a command value TM1 of the torque to be generated in the first rotary electric machine M1 (S330). CPU 31 operates the first inverter 25 in accordance with the command value TM1. Further, CPU 31 adds the second damping torque Δ2 multiplied by the second gain G2 to the second required torque TM2*. Then, CPU 31 calculates the added value as a command value TM2 of the torque to be generated in the second rotary electric machine M2 (S340). CPU 31 operates the second inverter 26 in response to the command value TM2.

Operation and Effect of the Embodiment

It should be noted that CPU 31 ends the series of processes shown in FIGS. 4 and 5 when the process of S340, S350 is ended and when a negative determination is made by S200, S210.

In the series of processes illustrated in FIGS. 4 and 5, CPU 31 sets "TM1*+Δ1×G1" as the command value TM1 of the torque to be generated in the first rotary electric machine M1. That is, in the vibration damping control, CPU 31 superimposes "Δ1×G1" on the required torque of the first rotary electric machine M1 in the driving force control. The first damping torque Δ1 is set to be a negative value during a decrease in the engine torque caused by the combustion stop process, and the first gain G1 is a positive value. Therefore, in the vibration damping control, CPU 31 lowers the torque of the first rotary electric machine M1 in conjunction with the lowering of the engine torque caused by the combustion stop process. The torque of the first rotary electric machine M1 is transmitted to the planetary carrier C of the power split mechanism 20. Therefore, the rotational torque of the planetary carrier C decreases as the engine torque decreases due to the combustion stop of a part of the cylinders 11 in the combustion stop process. As a result, the torsion of the torsional damper 19 caused by the decrease in the engine torque is reduced, so that the vibration of the engine 10 caused by the release of the torsion is reduced. Consequently, vibrations transmitted to the vehicle body B through the mounting path P1 are suppressed. As described above, by generating the vibration damping torque in the first rotary electric machine M1, the vibration transmission to the vehicle body B through the mounting path P1 can be suppressed. The first rotary electric machine M1 is not directly transmitted to the drive shaft 23 of the wheel 24. Therefore, the generation of the vibration damping torque by the first rotary electric machine M1 is limited in the effect of suppressing the transmission of the vibration to the vehicle body B through the drive shaft path P2. In the following explanation, such a process for generating the vibration damping torque in the first rotary electric machine M1 will be referred to as a first vibration damping process. The first vibration damping process is a series of processes related to the calculation of S340 and the command-value TM1 in FIG. 4. In the driving force control, the first required torque TM1* is basically set to a negative value. Therefore, the first rotary electric machine M1 performing the first vibration damping process generates electric power, and the generation of the vibration suppression torque is accompanied by an increase in the amount of electric power generation.

In addition, in the series of processes illustrated in FIGS. 4 and 5, CPU 31 sets "TM2*+Δ2×G2" as the command value TM1 of the torque to be generated in the second rotary electric machine M2. That is, in the vibration damping control, CPU 31 superimposes "Δ2×G2" on the required torque of the second rotary electric machine M2 in the driving force control. The second damping torque Δ2 is set to be a positive value during a decrease in the drive shaft torque caused by the combustion stop process, and the second gain G2 is a positive value. Therefore, in the vibration damping control, CPU 31 increases the torque of the second rotary electric machine M2 in conjunction with the decrease in the drive shaft torque caused by the combustion stop process. The second rotary electric machine M2 is mechanically connected to the drive shaft 23 of the wheel 24 via the speed reduction mechanism 21 and the differential mechanism 22. When the torque of the second rotary electric machine M2 is increased in conjunction with the decrease in the drive shaft torque, the variation in the drive shaft torque is reduced. Therefore, by generating the vibration damping torque in the second rotary electric machine M2, it is possible to suppress the transmission of the vibration to the vehicle body B through the drive shaft path P2. The torque of the second rotary electric machine M2 is not directly transmitted to the crankshaft 10A. Therefore, the generation of the vibration damping torque by the second rotary electric machine M2 is limited in the effect of suppressing the transmission of the vibration to the vehicle body B through the mounting path P1. In the following explanation, such a process for generating the vibration damping torque in the second rotary electric machine M2 will be referred to as a second vibration damping process. The second vibration damping process is a series of processes related to the calculation of S360 and the command-value TM2 in FIG. 5. The second required torque TM2* is positive or negative depending on the circumstances. In addition, the second required torque TM2* can be adjusted to some extent within the limits of the charging rate SOC of the in-vehicle battery 27.

Incidentally, when the first gain G1 is increased, the amplitude of the vibration damping torque superimposed on the torque of the first rotary electric machine M1 increases. On the other hand, when the first gain G1 is decreased, the amplitude of the vibration damping torque superimposed on the torque of the first rotary electric machine M1 increases. As described above, by adjusting the first gain G1, the magnitude of the vibration damping torque of the first rotary electric machine M1 generated by the first vibration damping process is adjusted.

When the second gain G2 is increased, the amplitude of the vibration damping torque superimposed on the torque of the second rotary electric machine M2 is increased. On the other hand, when the second gain G2 is decreased, the amplitude of the vibration damping torque superimposed on the torque of the second rotary electric machine M2 increases. As described above, by adjusting the second gain G2, the magnitude of the vibration damping torque of the first rotary electric machine M1 generated by the second vibration damping process is adjusted.

In the series of processes illustrated in FIGS. 4 and 5, CPU 31 sets the first gain G1 and the second gain G2 based on the engine rotational speed NE, the charging rate SOC, the battery temperature THB, the charging duration, the discharging duration, and the integrated current. In other words, CPU 31 adjusts the magnitude of the vibration damping torque generated in each of the first vibration damping processing and the second vibration damping processing in the damping control in accordance with these conditions.

Adjusting the Vibration Damping Torque by the Engine-Speed NE

In S250 of FIG. 4, CPU 31 sets the gain G1A applied to the first damping torque Δ1 and the gain G2A applied to the second damping torque Δ2 based on the engine rotational speed NE. In S250, CPU 31 sets the gain G1A to be larger when the engine rotational speed NE is low than when the engine rotational speed NE is high. CPU 31 is set such that the gain G2A is smaller when the engine rotational speed NE is low than when the engine rotational speed NE is high. That is, CPU 31 is adjusted so as to reduce the amplitude of the vibration damping torque generated in the first vibration damping process and so as to increase the amplitude of the vibration damping torque generated in the second vibration damping process when the engine rotational speed NE is low. In addition, CPU 31 is adjusted so as to increase the amplitude of the vibration damping torque generated in the first vibration damping process and so as to decrease the amplitude of the vibration damping torque generated in the second vibration damping process when the engine rotational speed NE is high.

Note that, as described above, the first damping torque Δ1 is calculated to have a larger value when the fluctuation of the engine torque due to the combustion stop process is large than when the fluctuation is small. Therefore, when the engine rotational speed NE is low, a ratio of the amplitude of the vibration damping torque generated in the first vibration damping process with respect to the amplitude of fluctuation of the engine torque by the combustion stop process is larger than that in the case where the engine rotational speed NE is high.

Figure 7:
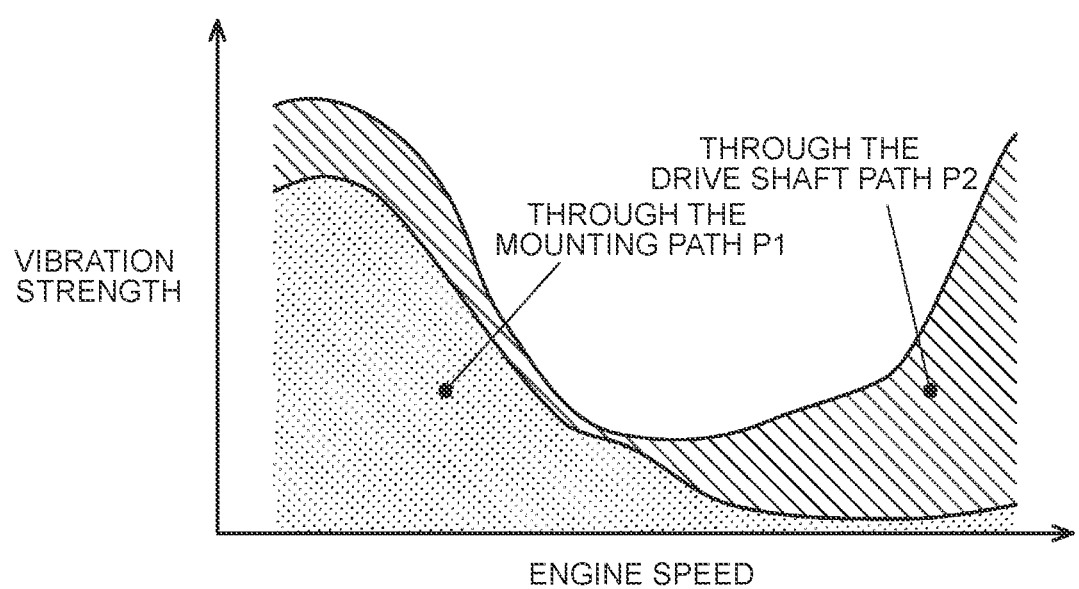
FIG. 7 is a graph showing the relationship between the engine rotational speed and the strength of the vehicle body vibration for each path.

FIG. 7 shows a relation between the strength of vibrations transmitted to the vehicle body B through each of the mounting path P1 and the drive shaft path P2 and the engine-speed NE. As shown in FIG. 7, when the engine rotational speed NE is low, the strength of the vibration transmitted through the mounting path P1 is greater than the strength of the vibration transmitted through the drive shaft path P2. At this time, even if the amplitude of the vibration damping torque in the second vibration damping process is increased to suppress the fluctuation of the drive shaft torque, the effect of suppressing the vehicle body vibration obtained thereby is limited. On the other hand, if the vibration of the engine 10 is suppressed by increasing the amplitude of the vibration damping torque in the first vibration damping process, the vehicle body vibration is greatly reduced.

Note that, as described above, the second damping torque Δ2 is calculated to have a larger value when the fluctuation of the drive shaft torque due to the combustion stop process is large than when the fluctuation is small. Therefore, when the engine rotational speed NE is higher, the ratio of the amplitude of the vibration damping torque generated in the second vibration damping process with respect the amplitude of the fluctuation of the drive shaft torque by the combustion stop process is larger than that in the case where the engine rotational speed NE is lower.

Incidentally, when the vibration damping torque is increased, the current is increased, and the electric system of hybrid electric vehicle is loaded more. Even if the amplitude of the vibration damping torque generated in the first vibration damping process is increased, the current is decreased by decreasing the amplitude of the vibration damping torque generated in the second vibration damping process. In the present embodiment, when the engine rotational speed NE is low, the amplitude of the vibration damping torque generated in the first vibration damping process is adjusted to be larger, and the amplitude of the vibration damping torque generated in the second vibration damping process is adjusted to be smaller. Therefore, it is possible to effectively suppress the vibration of the vehicle body when the engine-speed NE is low, while suppressing the increase of the current.

On the other hand, when the engine-speed NE is higher, the strength of the vibration transmitted through the drive shaft path P2 is greater than the strength of the vibration transmitted through the mounting path P1. On the other hand, in the present embodiment, when the engine rotational speed NE is high, the amplitude of the vibration damping torque generated in the first vibration damping process is adjusted to be smaller, and the amplitude of the vibration damping torque generated in the second vibration damping process is adjusted to be larger. Therefore, it is possible to effectively suppress the vehicle body vibration when the engine-speed NE is high, while suppressing the increase of the current.

Adjusting the Vibration Damping Torque by the Charging Rate SOC of the In-Vehicle Battery 27

In S260 of FIG. 4, CPU 31 sets the gain G1B applied to the first damping torque Δ1 and the gain G2B applied to the second damping torque Δ2 based on the charging rate SOC of the in-vehicle battery 27. In S260, CPU 31 is set such that the gain G1B is larger than when the charging rate SOC is low. CPU 31 is set such that the gain G2B is smaller than when the charging rate SOC is low. That is, when the charging rate SOC is high, CPU 31 is adjusted to a side where the amplitude of the vibration damping torque generated in the first vibration damping process is increased, and to a side where the amplitude of the vibration damping torque generated in the second vibration damping process is decreased. In addition, when the charging rate SOC is high, CPU 31 is adjusted to the side for reducing the amplitude of the vibration damping torque generated in the first vibration damping process and to the side for increasing the amplitude of the vibration damping torque generated in the second vibration damping process.

When the charging rate SOC is low and the discharging current is increased, the charging rate SOC may further decrease, and over-discharge of the on-board batteries 27 may occur. In the first vibration damping process, the vibration suppression torque is generated so as to decrease the torque of the first rotary electric machine M1 at the same cycle as the cycle of the decrease in the engine torque. When the amplitude of the vibration damping torque generated in the first vibration damping process is increased, the charging current of the in-vehicle battery 27 increases. On the other hand, in the second vibration damping process, the vibration damping torque is generated so as to increase the torque of the second rotary electric machine M2 in conjunction with the decrease in the drive shaft torque. When the amplitude of the vibration damping torque generated in the second vibration damping process is increased, the discharge current of the in-vehicle battery 27 decreases. Therefore, if the amplitudes of the vibration damping torques of the first vibration damping process and the second vibration damping process when the charging rate SOC is low are adjusted as described above, the discharging current is decreased and the charging current is increased, so that the over-discharge of the in-vehicle battery 27 is unlikely to occur. The reduction in the effect of suppressing the vehicle body vibration due to the reduction in the amplitude of the vibration damping torque generated in the second vibration damping process can be compensated for by the increase in the amplitude of the vibration damping torque generated in the first vibration damping process.

On the other hand, if the charging current increases when the charging rate SOC is high, there is a possibility that the in-vehicle batteries 27 become overcharged. When the amplitude of the vibration damping torque generated in the first vibration damping process is decreased, the charging current decreases, and when the amplitude of the vibration damping torque generated in the second vibration damping process is increased, the discharging current decreases. Therefore, if the amplitudes of the vibration damping torques of the first vibration damping process and the second vibration damping process when the charging rate SOC is high as described above are adjusted, the discharging current is increased and the charging current is decreased, so that the overcharge of the in-vehicle battery 27 is less likely to occur. The reduction in the effect of suppressing the vehicle body vibration due to the reduction in the amplitude of the vibration damping torque generated in the first vibration damping process can be compensated for by the increase in the amplitude of the vibration damping torque generated in the second vibration damping process.

Amplitude-Adjusted Vibration Damping by THB of Battery Temperature.

In S270 of FIG. 4, CPU 31 sets the gain G1C applied to the first damping torque Δ1 to be greater than when the battery temperature THB is higher than when the battery temperature is lower. Also, in S270, CPU 31 sets the gain G2C applied to the second damping torque Δ2 so as to be smaller than when the battery temperature THB is higher than when the battery temperature is lower. That is, when the battery temperature THB is higher, CPU 31 increases the amplitude of the vibration damping torque generated in the first vibration damping process and decreases the amplitude of the vibration damping torque generated in the second vibration damping process as compared with when the battery temperature THB is lower.

As described above, in the driving force control, basically, the first rotary electric machine M1 is regeneratively driven by setting a negative value to the first required torque TM1*. Further, in the first vibration damping process, the vibration damping torque is generated on the side that lowers the torque. Therefore, when the amplitude of the vibration damping torque generated in the first vibration damping process is increased, the peak value of the charging current inevitably increases. On the other hand, when the battery temperature THB is lower, the charging/discharging capability of the in-vehicle battery 27 is lowered. Therefore, when the battery temperature THB is low and charge/discharge is limited, the magnitude of the vibration damping torque generated in the first vibration damping process is also limited. On the other hand, the amplitude of the vibration damping torque generated in the second vibration damping process is unlikely to be limited. Therefore, if the amplitude of the vibration damping torque is adjusted based on the battery temperature THB as described above, it is easy to secure the effectiveness of suppressing the vehicle body vibration even when the charging and discharging of the vehicle-mounted battery 27 is limited by the battery temperature THB. In this case, it is desirable to adjust the feedback center of the second damping torque Δ2 so that the balance of charging and discharging of the in-vehicle battery 27 with the second rotary electric machine M2 is close to zero.

Amplitude Adjustment of Damping Torque by Charging Duration and Discharging Duration If the charging continues for a longer time than a certain amount of time, the charging capacity of the in-vehicle battery 27 decreases. In S280 of FIG. 5, when the charge duration is equal to or longer than the predetermined time T1, CPU 31 reduces the gain G1D applied to the first damping torque Δ1 and increases the gain G2D applied to the second damping torque Δ2. In other words, CPU 31 reduces the amplitude of the vibration damping torque generated in the first vibration damping process and increases the amplitude of the vibration damping torque generated in the second vibration damping process, compared to when the on-board battery 27 continues to be charged for a predetermined period of T1 or longer. Therefore, even in a state where charging is restricted, the effect of suppressing the vehicle body vibration can be ensured.

On the other hand, when the in-vehicle battery 27 continues to be discharged for a longer time than a certain amount, the discharging capability of the in-vehicle battery 27 decreases. In S290 of FIG. 5, when the discharging duration is equal to or longer than the predetermined time T2, CPU 31 increases the gain G1D applied to the first damping torque Δ1 and decreases the gain G2D applied to the second damping torque Δ2. That is, CPU 31 increases the amplitude of the vibration damping torque generated in the first vibration damping process and decreases the amplitude of the vibration damping torque generated in the second vibration damping process compared to the case where the discharging of the in-vehicle battery 27 continues for a predetermined period of T2 or longer. Therefore, even in a state in which discharge is limited, the effect of suppressing vehicle body vibration can be secured. Incidentally, when the magnitude of the braking torque generated in the first vibration damping process is increased to increase the regenerative capacity of the first rotary electric machine M1, the ionic bias of the electrolyte, which causes a decrease in the discharging capacity of the in-vehicle battery 27, is also eliminated.

Amplitude Adjustment of Damping Torque by Integrated Current

When a large current continues to flow through the electric system of hybrid electric vehicle, the electric circuitry components such as the first inverter 25 and the second inverter 26 become high in temperature. When the positive and negative reversals of the current flowing through the electric circuit component are repeated, the heat generation of the component increases.

As described above, in the driving force control, basically, the first rotary electric machine M1 is regeneratively driven by setting a negative value to the first required torque TM1*. Further, in the first vibration damping process, the vibration damping torque is generated on the side that lowers the torque. Therefore, the current between the first rotary electric machine M1 and the vehicle-mounted battery 27 during the execution of the first vibration damping process is maintained within a negative range. On the other hand, since both positive and negative values are set in the second required torque TM2*, the current flowing between the second rotary electric machine M2 and the in-vehicle battery 27 may be reversed in positive and negative directions during the execution of the second vibration damping process. The positive-negative reversal of the current is more likely to occur as the amplitude of the vibration damping torque generated in the second vibration damping process increases.

In contrast, in the present embodiment, in S300 of FIG. 5, CPU 31 sets the gain G1F applied to the first damping torque Δ1 to be larger than when the integrated current is large. On the other hand, in S300, CPU 31 sets the gain G2F applied to the second damping torque Δ2 to be smaller when the integrated current is large. That is, when the integrated current is large, CPU 31 adjusts the amplitude of the vibration damping torque generated in the first vibration damping process to a side where the amplitude of the vibration damping torque generated in the second vibration damping process is large, respectively. Therefore, it is possible to secure the effect of suppressing the vehicle body vibration while avoiding overheating of the electric circuit component.

The control device 30 of hybrid electric vehicle of the present embodiment described above has the following advantages.

(1) CPU 31 adjusts the magnitude of the vibration damping torque of the first rotary electric machine M1 generated in the first vibration damping process to be larger when the engine-speed NE is lower. That is, when the engine rotational speed NE is low, CPU 31 makes the ratio of the amplitude of the vibration damping torque generated in the first vibration damping process to the amplitude of the variation of the engine torque caused by the combustion stop process larger than that in the case where the engine rotational speed NE is high. In addition, CPU 31 adjusts the magnitude of the vibration damping torque of the second rotary electric machine M2 generated in the second vibration damping process to be larger when the engine-speed NE is higher. That is, when the engine rotational speed NE is high, CPU 31 makes the ratio of the amplitude of the vibration damping torque generated in the second vibration damping process to the amplitude of the variation of the drive shaft torque caused by the combustion stop process larger than the ratio of the amplitude of the vibration damping torque generated in the second vibration damping process when the engine rotational speed NE is low. Therefore, the vibration damping control can be effectively performed in accordance with the change in the transmission path of the vibration to the vehicle body B due to the engine-speed NE.

(2) CPU 31 adjusts the magnitude of the vibration damping torque of the second rotary electric machine M2 generated by the second damping control to be smaller when the engine-speed NE is lower. In addition, CPU 31 adjusts the magnitude of the vibration damping torque of the first rotary electric machine M1 generated in the first vibration damping process to be smaller when the engine-speed NE is higher. When the engine rotational speed NE is low, the vibration transmission through the drive shaft path P2 is reduced, and therefore, even if the amplitude of the vibration damping torque of the second rotary electric machine M2 generated in the second vibration damping control is reduced, the vibration transmission to the vehicle body B can be sufficiently suppressed. On the other hand, when the engine rotational speed NE is high, the vibration transmission through the mounting path P1 is reduced, and therefore, even if the amplitude of the vibration damping torque of the first rotary electric machine M1 generated in the first vibration damping control is reduced, the vibration transmission to the vehicle body B can be sufficiently suppressed. Therefore, the damping control can be efficiently performed.

(3) In the first vibration damping process, CPU 31 generates the vibration damping torque so as to reduce the torque of the first rotary electric machine M1 at the same cycle as the cycle of lowering the engine torque. Accordingly, by reducing the torsion of the torsional damper 19, it is possible to effectively suppress the transmission of vibrations to the vehicle body B through the mounting path P1.

(4) CPU 31 reduces the magnitude of the vibration damping torque generated in the first vibration damping process when the charging rate SOC of the in-vehicle battery 27 is higher than when the same charging rate SOC is lower. When the magnitude of the vibration damping torque generated in the first vibration damping process is reduced, the regenerative power generation amount of the first rotary electric machine M1 is reduced, and the charge amount of the on-vehicle batteries 27 is reduced. Therefore, overcharge of the in-vehicle battery 27 is less likely to occur. Further, CPU 31 increases the magnitude of the vibration damping torque generated in the second vibration damping process when the charging rate SOC of the in-vehicle battery 27 is higher than when the same charging rate SOC is lower. Therefore, the vehicle body vibration can be effectively suppressed while avoiding overcharging of the in-vehicle battery 27.

(5) CPU 31 increases the magnitude of the vibration damping torque generated in the second vibration damping process when the battery temperature THB is lower than when the battery temperature THB is higher. When the battery temperature THB is low, charging and discharging of the in-vehicle battery 27 are limited. On the other hand, in the first vibration damping process, the vibration damping torque is generated by regenerative driving of the first rotary electric machine M1. Therefore, when the battery-temperature THB is low, the generation of the vibration damping torque in the first vibration damping process may be limited. On the other hand, in the second vibration damping process, the balance of charge and discharge can be made close to zero by adjusting the feedback center of the second vibration suppression torque $\Delta2$, so that it is difficult to limit the generation of the vibration suppression torque even when the battery temperature THB is low. Therefore, it is possible to suppress the vibration of the vehicle body even when the battery-temperature THB is low. Further, CPU 31 reduces the magnitude of the vibration damping torque generated in the first vibration damping process when the battery temperature THB is lower than when the battery temperature THB is higher. Therefore, the first vibration damping process can be performed as long as the first vibration damping process can be performed under the limitation of charging and discharging when the battery-temperature THB is low.

(6) CPU 31 increases the magnitude of the vibration damping torque generated in the second vibration damping process when the on-vehicle battery 27 continues to be charged for a predetermined period of T1 or longer than when the on-vehicle battery is not continuously charged. When the charging of the in-vehicle battery 27 continues for a longer time than a certain amount, the charging capability of the in-vehicle battery 27 decreases. The second vibration damping process is less likely to be restricted in the generation of the vibration suppression torque due to the charge restriction of the in-vehicle battery 27 than the first vibration damping process. Therefore, even if the charging capacity of the in-vehicle battery 27 decreases due to the continuation of the charging, the effect of suppressing the vehicle body vibration hardly decreases. Further, CPU 31 reduces the magnitude of the vibration damping torque generated in the first vibration damping process when the in-vehicle battery 27 continues to be charged for a predetermined period of T1 or longer than when the charging is not continued. Therefore, the first vibration damping process can be performed within an allowable range even with the charging capacity of the in-vehicle battery 27 that has been reduced due to the continuation of charging.

(7) CPU 31 increases the magnitude of the vibration damping torque generated in the first vibration damping process when discharging of the in-vehicle battery 27 continues for a predetermined period of T2 or longer than when the discharging is not continued. If the discharge lasts longer than a certain amount of time, the discharge capacity of the in-vehicle battery 27 decreases. The first vibration damping process is less likely to be restricted by the generation of the vibration damping torque due to the discharge restriction of the in-vehicle battery 27 than the second vibration damping process. Therefore, even if the discharging capacity of the vehicle-mounted battery 27 decreases due to the continuation of the discharging, the effect of suppressing the vehicle body vibration hardly decreases. Further, CPU 31 reduces the magnitude of the vibration damping torque generated in the second vibration damping process when the in-vehicle batteries 27 continue to be discharged for a predetermined period of T2 or longer than when the discharging is not continued. Therefore, the second vibration damping process can be performed within an allowable range even in the discharge capacity of the vehicle-mounted battery 27, which is reduced due to the continuation of the discharge.

(8) When the integrated current of the in-vehicle battery 27 is large, CPU 31 adjusts the amplitude of the vibration damping torque generated in the first vibration damping process to a side where the amplitude of the vibration damping torque generated in the second vibration damping process is large, and adjusts the amplitude of the vibration damping torque generated in the second vibration damping process to a side where the amplitude is small. Therefore, it is possible to secure the effect of suppressing the vehicle body vibration while avoiding overheating of the electric circuit component.

Other Embodiments

The present embodiment can be modified and implemented as follows. The present embodiment and modification examples described below may be carried out in combination of each other within a technically consistent range.

One or more of the charging rate SOC, the battery temperature THB, the charging duration, the discharging duration, and the amplitude-adjustment of the vibration damping torque based on the integrated current may not be performed.

For example, the amplitude adjustment of the vibration damping torque may be performed by a method other than multiplying the gain, such as addition and subtraction of the correction amount.

The number of the cylinders 11 of the engine 10 is not limited to four. In the combustion stop process, the combustion of the two or more cylinders 11 may be stopped, and the combustion of the remaining one or more cylinders 11 may be continued.

The combustion stop process may be performed for purposes other than regeneration of the filtering device 15B, for example, for promoting temperature rise of the catalytic device 15A and suppressing vibrations caused by imbalance of the tire.

It is not essential to provide the torsional damper 19 in the crankshaft 10A. Even when the torsional damper 19 is not provided, torsion is generated in a member mechanically connected to the crankshaft 10A by stopping the combustion of a part of the cylinders. Therefore, even when the torsional damper 19 is not provided, the effect of suppressing the vehicle body vibration can be obtained by performing the first vibration damping process in the above-described manner.

In the first vibration damping process, similar to the second vibration damping process, the vibration damping torque may be generated so as to increase the torque of the first rotary electric machine M1 in conjunction with a decrease in the engine torque.

What is claimed is:

1. A control device that controls a hybrid electric vehicle including an engine including a plurality of cylinders,
    a first rotary electric machine, a second rotary electric machine, a power split mechanism, and
    an in-vehicle battery electrically connected to the first rotary electric machine and the second rotary electric machine,
        the hybrid electric vehicle being a vehicle in which the engine and the first rotary electric machine are drivingly connected to a drive shaft of wheels via the power split mechanism, and the second rotary electric machine is connected to the drive shaft of the wheels without the power split mechanism, the control device being configured to execute:
            a combustion stop process of continuing combustion of remaining cylinders in a state in which combustion of a part of the plurality of cylinders is stopped;
            a first vibration damping process of generating, in the first rotary electric machine, a vibration damping torque for suppressing vehicle body vibration associated with an execution of the combustion stop process;
            a second vibration damping process of generating, in the second rotary electric machine, the vibration damping torque for suppressing the vehicle body vibration associated with the execution of the combustion stop process; and
            an adjusting process of adjusting an amplitude of the vibration damping torque generated in the second vibration damping process to an increasing side when an engine rotational speed is high, and adjusting an amplitude of the vibration damping torque generated in the first vibration damping process to an increasing side when the engine rotational speed is low, wherein
        the first vibration damping process is a process of generating the vibration damping torque such that a torque of the first rotary electric machine decreases at the same cycle as a cycle of a torque decrease of the engine due to a combustion stop of the part of the cylinders, and
        the adjusting process causes the amplitude of the vibration damping torque generated in the first vibration damping process to be smaller when a charging rate of the in-vehicle battery is high than when the charging rate is low.

2. The control device according to claim 1, wherein the adjusting process causes the amplitude of the vibration damping torque generated in the second vibration damping process to be larger when a charging rate of the in-vehicle battery is high than when the charging rate is low.

3. The control device according to claim 1, wherein the adjusting process causes the amplitude of the vibration damping torque generated in the first vibration damping process to be smaller when a temperature of the in-vehicle battery is low than when the temperature is high.

4. The control device according to claim 3, wherein the adjusting process causes the amplitude of the vibration damping torque generated in the second vibration damping process to be larger when the temperature of the in-vehicle battery is low than when the temperature is high.

5. The control device according to claim 1, wherein the adjusting process causes the amplitude of the vibration damping torque generated in the second vibration damping process to be larger when charging of the in-vehicle battery is continued for a predetermined time or more than when charging of the in-vehicle battery is not continued for the predetermined time or more.

6. The control device according to claim 1, wherein the adjusting process causes the amplitude of the vibration damping torque generated in the first vibration damping process to be larger when discharging of the in-vehicle battery is continued for a predetermined time or more than when discharging of the in-vehicle battery is not continued for the predetermined time or more.

7. The control device according to claim 1, wherein when an integrated current of the in-vehicle battery is large, the adjusting process adjusts the amplitude of the vibration damping torque generated in the first vibration damping process to an increasing side and the amplitude of the vibration damping torque generated in the second vibration damping process to a decreasing side.

* * * * *